United States Patent
Stretz et al.

(10) Patent No.: US 8,970,082 B2
(45) Date of Patent: Mar. 3, 2015

(54) PERMANENT MAGNET ROTORS INCLUDING RETENTION FEATURES AND METHODS OF ASSEMBLING THE SAME

(75) Inventors: Steven Stretz, Wausau, WI (US); Mark Bartz, Wausau, WI (US)

(73) Assignee: Regal Beloit America, Inc., Beloit, WI (US)

( * ) Notice: Subject to any disclaimer, the term of this patent is extended or adjusted under 35 U.S.C. 154(b) by 245 days.

(21) Appl. No.: 13/190,082

(22) Filed: Jul. 25, 2011

(65) Prior Publication Data

US 2013/0026873 A1 Jan. 31, 2013

(51) Int. Cl.
- H02K 1/27 (2006.01)
- H02K 15/03 (2006.01)
- H02K 1/28 (2006.01)

(52) U.S. Cl.
CPC ............... *H02K 15/03* (2013.01); *H02K 1/276* (2013.01)
USPC ................................................... 310/156.53

(58) Field of Classification Search
CPC ........... H02K 1/28; H02K 1/27; H02K 21/12; H02K 21/14
USPC .............. 310/156.53, 156.56, 156.57, 156.48
IPC ........................... H02K 1/28, 1/27, 21/12, 21/14
See application file for complete search history.

(56) References Cited

U.S. PATENT DOCUMENTS

| | | | |
|---|---|---|---|
| 5,111,094 A | 5/1992 | Patel et al. | |
| 5,258,678 A | 11/1993 | Futami | |
| 5,369,325 A * | 11/1994 | Nagate et al. | 310/156.54 |
| 5,581,140 A * | 12/1996 | Futami et al. | 310/156.53 |
| 5,650,680 A | 7/1997 | Chula | |
| 5,679,995 A * | 10/1997 | Nagate et al. | 310/156.54 |
| 5,959,386 A | 9/1999 | Knight | |
| 6,794,784 B2 * | 9/2004 | Takahashi et al. | 310/156.56 |
| 6,891,298 B2 | 5/2005 | Gary | |
| 7,183,686 B2 | 2/2007 | Sasaki et al. | |
| 2006/0028082 A1 * | 2/2006 | Asagara et al. | 310/156.53 |
| 2007/0103024 A1 * | 5/2007 | Nakayama et al. | 310/156.53 |
| 2008/0272667 A1 * | 11/2008 | Ionel et al. | 310/156.83 |
| 2009/0184597 A1 * | 7/2009 | Lee | 310/156.56 |
| 2009/0278416 A1 * | 11/2009 | Ida et al. | 310/156.43 |

* cited by examiner

*Primary Examiner* — Michael Andrews
(74) *Attorney, Agent, or Firm* — Armstrong Teasdale LLP (57) ABSTRACT

A permanent magnet rotor is described. The permanent magnet rotor includes at least one permanent magnet and a rotor core including a first end and a second end. The rotor core includes at least one inner wall that defines a permanent magnet opening configured to receive the at least one permanent magnet. The rotor core further includes at least one permanent magnet retention feature extending substantially radially from the at least one inner wall and configured to maintain a position of the at least one permanent magnet with respect to the at least one permanent magnet opening.

20 Claims, 5 Drawing Sheets

PERMANENT MAGNET ROTORS INCLUDING RETENTION FEATURES AND METHODS OF ASSEMBLING THE SAME

BACKGROUND OF THE INVENTION

The embodiments described herein relate generally to electric machines, and more specifically, to an interior permanent magnet rotor for use in an electric machine and methods of assembling the same.

Various types of electric machines include permanent magnets. For example, a brushless direct current (BLDC) motor may include a plurality of permanent magnets coupled to an exterior surface of a rotor core. Typically, the plurality of permanent magnets are coupled to the exterior surface of the rotor core using an adhesive and/or an outer retaining covering. The coupling between the permanent magnets and the rotor core must resist forces exerted on the permanent magnets during high speed rotation tending to separate the permanent magnets from the rotor core.

Permanent magnets may also be positioned within a rotor core. Such a rotor may be referred to as an interior permanent magnet rotor. Slots are formed within the rotor and magnets are inserted into the slots. The magnet slots must be larger than the magnets to allow the magnets to be inserted. However, the magnets must be secured within the slots to prevent movement of the magnets during operation of the machine. The performance of the machine depends on maintaining the magnets in a known position within the rotor. To secure the magnets in a fixed position relative to the rotor, the slots may be tapered in order to pinch the magnets. A tapered slot is difficult to implement due to the stagger from lamination to lamination and manufacturing tolerances. A permanent magnet may also be secured within a slot using an adhesive. However, adhesives have a limited life due to factors such as temperature, temperature cycling, and environmental conditions.

BRIEF DESCRIPTION OF THE INVENTION

In one aspect, a permanent magnet rotor is provided. The permanent magnet rotor includes at least one permanent magnet and a rotor core including a first end and a second end. The rotor core includes at least one inner wall that defines a permanent magnet opening configured to receive the at least one permanent magnet. The rotor core further includes at least one permanent magnet retention feature extending substantially radially from the at least one inner wall and configured to maintain a position of the at least one permanent magnet with respect to the at least one permanent magnet opening.

In another aspect, an electric machine is provided. The electric machine includes a machine housing and a stator disposed at least partially within the machine housing. The electric machine also includes a rotor disposed at least partially within the machine housing and configured to rotate with respect to the stator. The rotor includes at least one permanent magnet and a rotor core. The rotor core includes a first end, a second end, and at least one inner wall defining a permanent magnet opening configured to receive the at least one permanent magnet. The rotor core further includes at least one permanent magnet retention feature extending substantially radially from the at least one inner wall and configured to maintain a position of the at least one permanent magnet with respect to the at least one permanent magnet opening.

In yet another aspect, a method for maintaining a position of a permanent magnet with respect to a rotor core is provided. The rotor core includes a first end, a second end, and at least one inner wall that defines a permanent magnet opening configured to receive the permanent magnet. The permanent magnet extends between the first end and the second end of the rotor core. The method includes providing at least one permanent magnet retention feature for biasing the permanent magnet toward the at least one inner wall. The method also includes positioning the permanent magnet within the permanent magnet opening.

DETAILED DESCRIPTION OF THE INVENTION

The methods, systems, and apparatus described herein maintain a position of a permanent magnet within a permanent magnet rotor. Although described herein as associated with an electric motor, the methods, systems, and apparatus described herein may also be associated with an electric generator. As described herein, permanent magnet openings within a rotor core include at least one permanent magnet retention feature configured to maintain a position of the magnet within the opening while reducing a dependence on low manufacturing tolerance.

Figure 1:
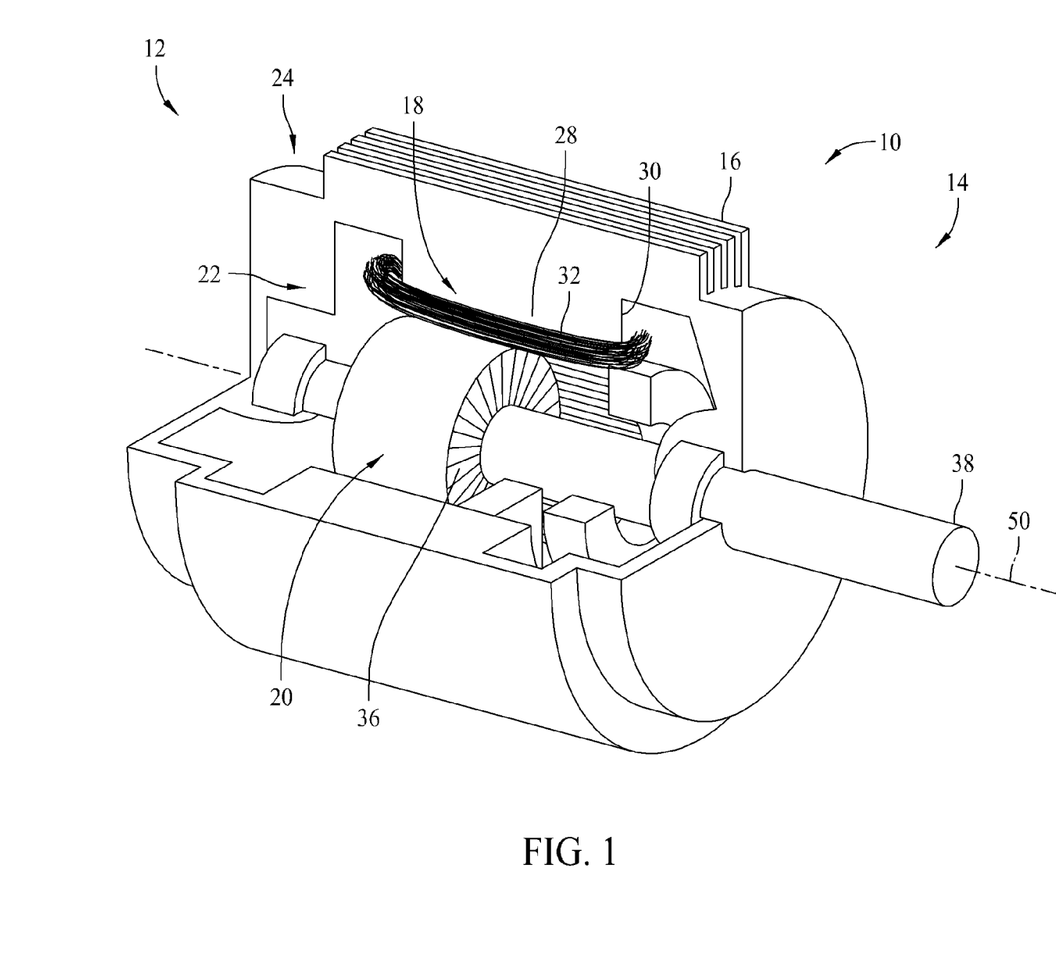
FIG. 1 is a perspective cut-away view of an exemplary electric machine.

FIG. 1 is a perspective cut-away view of an exemplary electric motor 10. Although referred to herein as electric motor 10, electric motor 10 can be operated as either a generator or a motor. Electric motor 10 includes a first end 12 and a second end 14. Electric motor 10 includes a motor assembly housing 16. Electric motor 10 also includes a stationary assembly 18 and a rotatable assembly 20. Motor assembly housing 16 defines an interior 22 and an exterior 24 of motor 10 and is configured to at least partially enclose and protect stationary assembly 18 and rotatable assembly 20. Stationary assembly 18 includes a stator core 28, which includes a plurality of stator teeth 30 and a plurality of windings 32 wound around stator teeth 30. In an exemplary embodiment, stationary assembly 18 is a three phase salient pole stator assembly, stator core 28 is formed from a stack of laminations made of a highly magnetically permeable material, and windings 32 are wound on stator core 28 in a manner known to those of ordinary skill in the art.

Rotatable assembly 20 includes a permanent magnet rotor core 36 and a shaft 38. In the exemplary embodiment, rotor core 36 is formed from a stack of laminations made of a magnetically permeable material and is substantially received in a central bore of stator core 28. Rotor core 36 and stator core 28 are illustrated as being solid in FIG. 1 for simplicity, their construction being well known to those of ordinary skill in the art. While FIG. 1 is an illustration of a three phase electric motor, the methods and apparatus described herein may be included within motors having any number of phases, including single phase and multiple phase electric motors.

In the exemplary embodiment, electric motor 10 is coupled to a fan (not shown) for moving air through an air handling system, for blowing air over cooling coils, and/or for driving a compressor within an air conditioning/refrigeration system. More specifically, motor 10 may be used in air moving applications used in the heating, ventilation, and air conditioning (HVAC) industry, for example, in residential applications using ⅓ horsepower (hp) to 1 hp motors. Motor 10 may also be used in commercial and industrial applications and/or hermetic compressor motors used in air conditioning applications, where motor 10 may have a rating of greater than 1 hp. Although described herein in the context of an air handling system, electric motor 10 may engage any suitable work component and be configured to drive such a work component.

Figure 2:
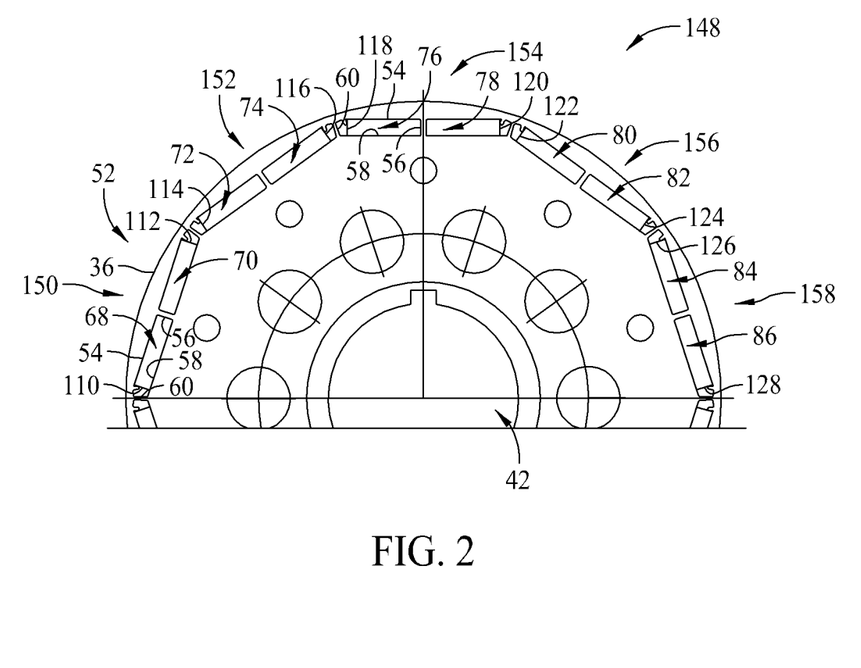
FIG. 2 is a front view of an exemplary rotor core that may be included within the electric machine shown in FIG. 1.

FIG. 2 is a front view of an exemplary embodiment of rotor core 36 (shown in FIG. 1) that may be included within electric motor 10 (shown in FIG. 1). In the exemplary embodiment, rotatable assembly 20 includes rotor core 36 and shaft 38. Rotatable assembly 20 may also be referred to as an interior permanent magnet rotor. Examples of motors that may include interior permanent magnet rotors include, but are not limited to, electronically commutated motors (ECMs). ECMs may include, but are not limited to, brushless direct current (BLDC) motors, brushless alternating current (BLAC) motors, and variable reluctance motors.

Rotor core 36 includes a shaft opening 42 having a diameter corresponding to a diameter of shaft 38. Rotor core 36 and shaft 38 are concentric and configured to rotate about an axis of rotation 50 (shown in FIG. 1). In the exemplary embodiment, rotor core 36 includes a plurality of laminations that are either interlocked or loose. In an alternative embodiment, rotor core 36 is a solid core. For example, rotor core 36 may be formed using a sintering process from a soft magnetic composite (SMC) material, a soft magnetic alloy (SMA) material, and/or a powdered ferrite material.

Rotor core 36 further includes a plurality of inner walls that define a plurality of permanent magnet openings 52. For example, a first inner wall 54, a second inner wall 56, a third inner wall 58, and a fourth inner wall 60 define a first permanent magnet opening 68 of the plurality of permanent magnet openings 52. In the exemplary embodiment, permanent magnet openings 52 further include a second permanent magnet opening 70, a third permanent magnet opening 72, a fourth permanent magnet opening 74, a fifth permanent magnet opening 76, a sixth permanent magnet opening 78, a seventh permanent magnet opening 80, an eighth permanent magnet opening 82, a ninth permanent magnet opening 84, a tenth permanent magnet opening 86, an eleventh permanent magnet opening (not shown in FIG. 2), a twelfth permanent magnet opening (not shown in FIG. 2), a thirteenth permanent magnet opening (not shown in FIG. 2), a fourteenth permanent magnet opening (not shown in FIG. 2), a fifteenth permanent magnet opening (not shown in FIG. 2), a sixteenth permanent magnet opening (not shown in FIG. 2), a seventeenth permanent magnet opening (not shown in FIG. 2), an eighteenth permanent magnet opening (not shown in FIG. 2), a nineteenth permanent magnet opening (not shown in FIG. 2), and a twentieth permanent magnet opening (not shown in FIG. 2).

The permanent magnet openings 52 extend from first end 12 (shown in FIG. 1), through rotor core 36, to second end 14 (shown in FIG. 1). Each of the permanent magnet openings 52 is configured to receive one or more permanent magnets. The permanent magnet extends at least partially through opening 52 from first end 12 to second end 14 of rotor core 36. For example, a first permanent magnet 110 is positioned within first permanent magnet opening 68, a second permanent magnet 112 is positioned within second permanent magnet opening 70, a third permanent magnet 114 is positioned within third permanent magnet opening 72, a fourth permanent magnet 116 is positioned within fourth permanent magnet opening 74, a fifth permanent magnet 118 is positioned within fifth permanent magnet opening 76, a sixth permanent magnet 120 is positioned within sixth permanent magnet opening 78, a seventh permanent magnet 122 is positioned within seventh permanent magnet opening 80, an eighth permanent magnet 124 is positioned within eighth permanent magnet opening 82, a ninth permanent magnet 126 is positioned within ninth permanent magnet opening 84, and a tenth permanent magnet 128 is positioned within tenth permanent magnet opening 86.

In the exemplary embodiment, rotor core 36 includes a plurality of rotor poles 148, for example, ten rotor poles. Each rotor pole 148 includes multiple permanent magnets. For example, a first rotor pole 150 is produced by first permanent magnet 110 and second permanent magnet 112, a second rotor pole 152 is produced by third permanent magnet 114 and fourth permanent magnet 116, a third rotor pole 154 is produced by fifth permanent magnet 118 and sixth permanent magnet 120, a fourth rotor pole 156 is produced by seventh permanent magnet 122 and eighth permanent magnet 124, and a fifth rotor pole 158 is produced by ninth permanent magnet 126 and tenth permanent magnet 128. Although described as including ten poles, rotor core 36 may include any number of poles that allows motor 10 to function as described herein. Furthermore, although described as each being produced by two permanent magnets, each of the plurality of rotor poles 148 may be produced by three permanent magnets, four permanent magnets, or any other suitable number of permanent magnets that allows electric motor 10 to function as described herein.

Figure 3:
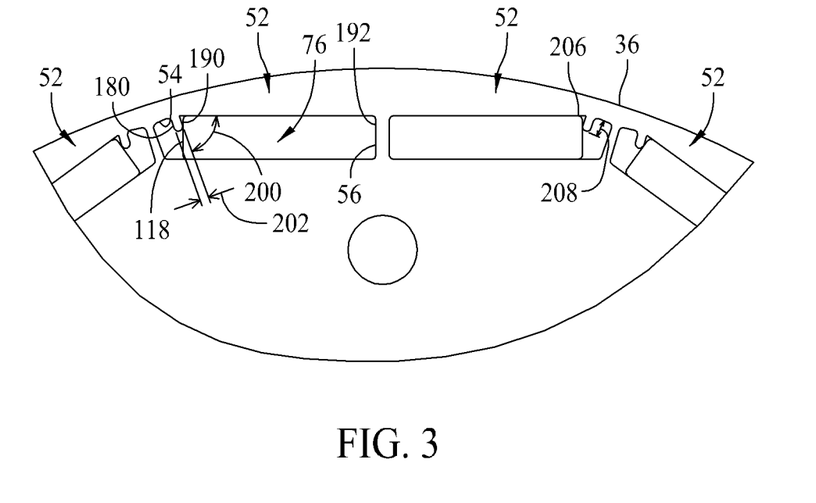
FIG. 3 is an expanded view of a portion of the rotor core shown in FIG. 2.

FIG. 3 is an expanded front view of a portion (A) of rotor core 36 (shown in FIG. 2). As described above, in the exemplary embodiment, rotor core 36 includes permanent magnet openings 52. In the exemplary embodiment, openings 52 are generally rectangular openings. Although described as rectangular, openings 52 may be any suitable shape, corresponding to the shape of the permanent magnets, that allows rotatable assembly 20 to function as described herein.

In the exemplary embodiment, permanent magnet openings 52 include at least one permanent magnet retention feature 180. For example, fifth permanent magnet opening 76 includes at least one permanent magnet retention feature 180. In the exemplary embodiment, permanent magnet retention feature 180 is a protrusion that extends substantially radially from first inner wall 54. Retention feature 180 may also be referred to as a protruding member and/or a tab. Permanent magnet retention feature 180 maintains a position of fifth permanent magnet 118 with respect to fifth permanent magnet opening 76. More specifically, retention feature 180 is in contact with a first edge 190 of permanent magnet 118 and is configured to bias permanent magnet 118 toward second inner wall 56.

In the exemplary embodiment, permanent magnet retention feature 180 extends axially between first end 12 (shown in FIG. 1) and second end 14 (shown in FIG. 1) of rotor core 36. Retention feature 180 may be configured to provide slight flexibility, i.e., some flex with respect to inner wall 54. This flex allows permanent magnets having a wider range of dimensions, for example, due to larger manufacturing tolerance, to be held in position within permanent magnet opening 76. Furthermore, this flex enables retention feature 180 to maintain contact between a second end 192 of permanent magnet 118 and second inner wall 56 for magnets having a higher manufacturing tolerance than if permanent magnet opening 76 was solid and inflexible on all sides.

In the exemplary embodiment, to provide the flexibility described above, retention feature 180 extends from first inner wall 54 such that an angle 200 between retention feature 180 and first inner wall 54 is less than ninety degrees. Furthermore, a thickness 202 of retention feature 180 is determined to provide retention feature 180 with a predefined flexibility. Permanent magnet 118 may include rounded corners having a predefined radius 206. In the exemplary embodiment, a length 208 of retention feature 180 (i.e., a distance retention feature 180 extends into the permanent magnet opening) is determined such that permanent magnet retention feature 180 extends past radius 206 to an edge, for example, edge 190, of the permanent magnet.

Figure 4:
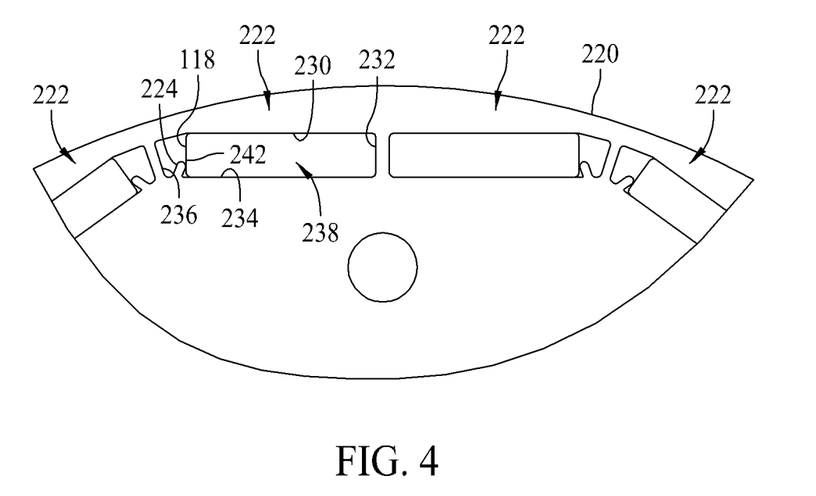
FIG. 4 is a front view of a first alternative embodiment of a rotor core that may be included within the electric machine shown in FIG. 1.

FIG. 4 is a front view of a first alternative embodiment of a rotor core 220 that may be included within electric motor 10 (shown in FIG. 1). In the alternative embodiment, rotor core 220 includes a plurality of permanent magnet openings 222 that each includes at least one permanent magnet retention feature 224. For example, a first inner wall 230, a second inner wall 232, a third inner wall 234, and a fourth inner wall 236 define a first permanent magnet opening 238 of plurality of permanent magnet openings 222. In the alternative embodiment, permanent magnet retention feature 224 is a protrusion that extends substantially radially from third inner wall 234. Permanent magnet retention feature 224 maintains a position of a permanent magnet 240 with respect to first permanent magnet opening 238. More specifically, retention feature 224 is in contact with a first edge 242 of permanent magnet 240 and is configured to bias permanent magnet 240 toward second inner wall 232.

Figure 5:
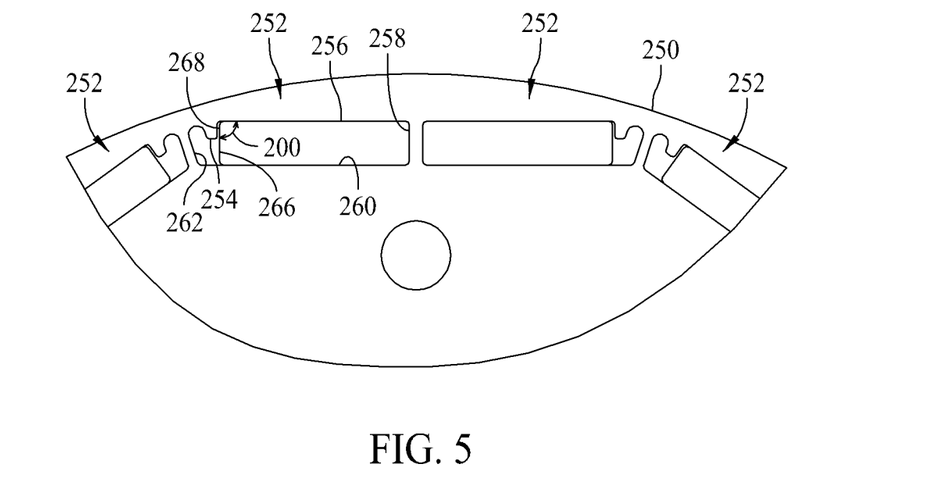
FIG. 5 is a front view of a second alternative embodiment of a rotor core that may be included within the electric machine shown in FIG. 1.

FIG. 5 is a front view of a second alternative embodiment of a rotor core 250 that may be included within electric motor 10 (shown in FIG. 1). In the alternative embodiment, rotor core 250 includes a plurality of permanent magnet openings 252. In the alternative embodiment, each of the permanent magnet openings 252 includes at least one permanent magnet retention feature 254. For example, a first inner wall 256, a second inner wall 258, a third inner wall 260, and a fourth inner wall 262 define a first permanent magnet opening 264 of the plurality of permanent magnet openings 252. In the alternative embodiment, permanent magnet retention feature 254 is a protrusion that extends substantially radially from first inner wall 256. Permanent magnet retention feature 254 maintains a position of a permanent magnet 266 with respect to first permanent magnet opening 264. More specifically, retention feature 254 is in contact with a first edge 268 of permanent magnet 266. In the alternative embodiment, angle 200 between first inner wall 256 and retention feature 254 is approximately equal to ninety degrees. Permanent magnet retention feature 254 does not flex and bias permanent magnet 266 as described above with respect to retention feature 180 (shown in FIG. 3) and retention feature 224 (shown in FIG. 4). Retention feature 254 helps maintain a position of permanent magnet 266 with respect to permanent magnet opening 264, however, does not provide the flexibility and secure hold provided by a flexible retention feature, for example, retention features 180 and/or 224.

Figure 6:
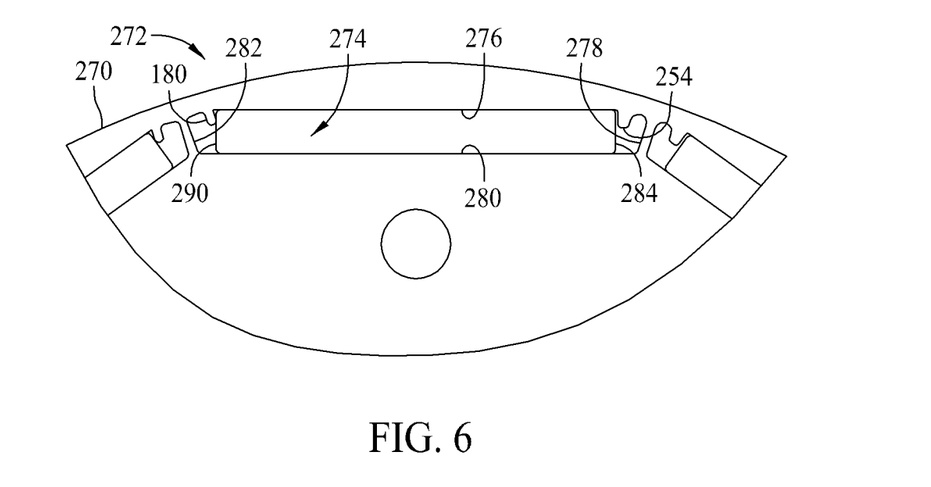
FIG. 6 is a front view of a third alternative embodiment of a rotor core that may be included within the electric machine shown in FIG. 1.

FIG. 6 is a front view of a third alternative embodiment of a rotor core 270 that may be included within electric motor 10 (shown in FIG. 1). In the third alternative embodiment, rotor core 270 includes a plurality of permanent magnet openings 272 including a first permanent magnet opening 274. A first inner wall 276, a second inner wall 278, a third inner wall 280, and a fourth inner wall 282 define first permanent magnet opening 274. In the third alternative embodiment, each rotor pole is generated by a single permanent magnet. A first permanent magnet 284 is positioned within first permanent magnet opening 274.

In the third alternative embodiment, each permanent magnet opening includes two permanent magnet retention features. A first permanent magnet retention feature, for example, retention feature 180 (shown in FIG. 3), and a second permanent magnet retention feature, for example, retention feature 254 (shown in FIG. 5), extend from first inner wall 276. Permanent magnet retention features 180 and 254 maintain a position of a permanent magnet 284 with respect to first permanent magnet opening 274. More specifically, retention feature 180 is in contact with a first edge 290 of permanent magnet 284 and is configured to bias permanent magnet 284 toward second retention feature 254.

Figure 7:
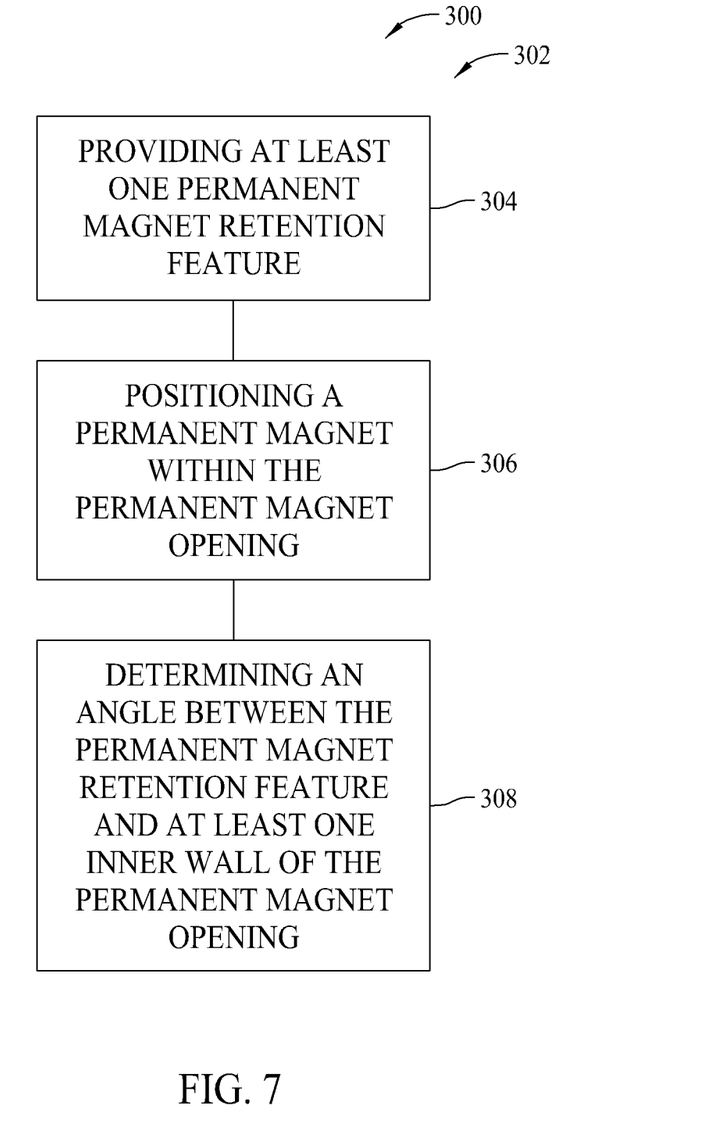
FIG. 7 is a flow chart of an exemplary method for maintaining a position of a permanent magnet with respect to a rotor core that may be included within the electric machine shown in FIG. 1.

FIG. 7 is a flow chart 300 of an exemplary method 302 for maintaining a position of a permanent magnet, for example, fifth permanent magnet 118 (shown in FIG. 3), with respect to a rotor core, for example, rotor core 36 (shown in FIG. 3). Method 302 includes providing 304 at least one permanent magnet retention feature, for example, retention feature 180 (shown in FIG. 3) for biasing permanent magnet 118 toward at least one inner wall, for example, second inner wall 56 (shown in FIG. 3). Method 302 also includes positioning 306 permanent magnet 118 within permanent magnet opening 72.

Providing 304 at least one permanent magnet retention feature may include providing at least one flexible protrusion extending from first inner wall 54. Furthermore, positioning 306 permanent magnet 118 within permanent magnet opening 72 may include positioning permanent magnet 118 at least partially between permanent magnet retention feature 180 and permanent magnet opening 72. Moreover, method 302 may include determining 308 an angle 200 (shown in FIG. 3) between permanent magnet retention feature 180 and the at least one inner wall 54 that provides pressure to permanent magnet 118 and maintains the position of permanent magnet 118 with respect to permanent magnet opening 72.

Described herein are exemplary methods, systems, and apparatus for maintaining a position of a permanent magnet with respect to a rotor core. As described herein, magnet slots within a rotor include at least one permanent magnet retention feature configured to maintain a position of the magnet within the slot while allowing for increased manufacturing tolerance.

The methods, systems, and apparatus described herein facilitate efficient and economical manufacturing of a permanent magnet rotor for use in an electric machine. Exemplary embodiments of methods, systems, and apparatus are described and/or illustrated herein in detail. The methods, systems, and apparatus are not limited to the specific embodiments described herein, but rather, components of each apparatus or system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A permanent magnet rotor comprising:
   at least one permanent magnet; and
   a rotor core including a first end and a second end, said rotor core comprising a first circumferential sidewall, a second circumferential sidewall, a radially inner wall, and a radially outer wall that define a permanent magnet opening configured to receive said at least one permanent magnet, wherein said second circumferential sidewall is oriented substantially perpendicular to one or more of said radially inner wall and said radially outer wall, said rotor core further comprising at least one permanent magnet retention feature extending at an acute angle from one of said radially inner wall and said radially outer wall proximate said first circumferential sidewall and toward said second circumferential sidewall, said at least one retention feature configured to maintain a position of said at least one permanent magnet with respect to the at least one permanent magnet opening by biasing said at least one permanent magnet against said second circumferential sidewall such that circumferential movement of said permanent magnet is restricted.

2. A rotor in accordance with claim 1 further comprising a shaft, said at least one permanent magnet positioned within said rotor core substantially parallel to said shaft and an axis of rotation of said rotor.

3. A rotor in accordance with claim 1, wherein said at least one permanent magnet comprises at least two permanent magnets per rotor pole.

4. A rotor in accordance with claim 1, wherein said at least one permanent magnet retention feature extends axially between said first end and said second end.

5. A rotor in accordance with claim 1, wherein said at least one permanent magnet retention feature comprises a flexible protrusion.

6. A rotor in accordance with claim 5, wherein said flexible protrusion is in contact with a first edge of said at least one permanent magnet.

7. A rotor in accordance with claim 1, wherein an angle between a side of said at least one permanent magnet retention feature in contact with said permanent magnet and said radially inner or radially outer wall from which said retention feature extends is less than ninety degrees after insertion of said permanent magnet into said permanent magnet opening.

8. A rotor in accordance with claim 1, wherein said rotor core comprises a plurality of laminations, wherein each lamination comprises a first circumferential sidewall, a second circumferential sidewall, a radially inner wall, and a radially outer wall that defines said permanent magnet opening and at least one permanent magnet retention feature extending substantially radially from said from at least one of said radially inner wall and said radially outer wall.

9. An electric machine comprising:
   a machine housing;
   a stator disposed at least partially within said machine housing; and
   a rotor disposed at least partially within said machine housing, said rotor configured to rotate with respect to said stator, said rotor comprising,
   at least one permanent magnet;
   a rotor core including a first end, a second end, a first circumferential sidewall, a second circumferential sidewall, a radially inner wall, and a radially outer wall defining a permanent magnet opening configured to receive said at least one permanent magnet, wherein said second circumferential sidewall is oriented substantially perpendicular to one or more of said radially inner wall and said radially outer wall, said rotor core further comprising at least one permanent magnet retention feature extending at an acute angle from one of said radially inner wall and said radially outer wall proximate said first circumferential sidewall and toward said second circumferential sidewall, said at least one retention feature configured to maintain a position of said at least one permanent magnet with respect to the at least one permanent magnet opening by biasing said at least one permanent magnet against said second circumferential sidewall such that circumferential movement of said permanent magnet is restricted.

10. An electric machine in accordance with claim 9, wherein said at least one permanent magnet retention feature extends axially between said first end and said second end.

11. An electric machine in accordance with claim 9, wherein said at least one permanent magnet comprises at least two permanent magnets per rotor pole.

12. An electric machine in accordance with claim 9 further comprising a shaft, said at least one permanent magnet positioned within said rotor core substantially parallel to said shaft and an axis of rotation of said rotor.

13. An electric machine in accordance with claim 9, wherein said at least one permanent magnet retention feature comprises a flexible protrusion.

14. An electric machine in accordance with claim 13, wherein said flexible protrusion is in contact with a first edge of said at least one permanent magnet.

15. An electric machine in accordance with claim 9, wherein an angle between a side of said at least one permanent magnet retention feature in contact with said permanent magnet and said radially inner or radially outer wall from which said retention feature extends is less than ninety degrees after insertion of said permanent magnet into said permanent magnet opening.

16. An electric machine in accordance with claim 9, wherein said rotor core comprises a plurality of laminations, wherein each lamination comprises a first circumferential sidewall, a second circumferential sidewall, a radially inner wall, and a radially outer wall that defines said permanent magnet opening and at least one permanent magnet retention feature extending at an acute angle from one of said radially inner wall and said radially outer wall proximate said first circumferential sidewall and toward said second circumferential sidewall.

17. A method for maintaining a position of a permanent magnet with respect to a rotor core that includes a first end, a second end, a first circumferential sidewall, a second circumferential sidewall, a radially inner wall, and a radially outer wall that defines a permanent magnet opening configured to receive the permanent magnet, the permanent magnet extending between the first end and the second end, said method comprising:

providing at least one permanent magnet retention feature that extends at an acute angle from one of the radially inner wall and the radially outer wall proximate the first circumferential sidewall and toward the second circumferential sidewall for biasing the permanent magnet against the second circumferential is sidewall such that circumferential movement of the permanent magnet is restricted, wherein the second circumferential sidewall is oriented substantially perpendicular to one or more of the radially inner wall and the radially outer wall; and positioning the permanent magnet within the permanent magnet opening.

18. A method in accordance with claim 17, wherein providing at least one permanent magnet retention feature comprises providing at least one flexible protrusion extending from at least one of the radially inner wall and the radially outer wall.

19. A method in accordance with claim 17, wherein positioning the permanent magnet within the permanent magnet opening comprises positioning the permanent magnet at least partially between the at least one permanent magnet retention feature and the permanent magnet opening.

20. A method in accordance with claim 17 further comprising determining an angle between the at least one permanent magnet retention feature and one of the radially inner wall or radially outer wall from which the retention feature extends that provides pressure to the permanent magnet and maintains the position of the permanent magnet with respect to the rotor core.

\* \* \* \* \*